US011423683B2

(12) United States Patent
Werner et al.

(10) Patent No.: US 11,423,683 B2
(45) Date of Patent: Aug. 23, 2022

(54) SOURCE LINKING AND SUBSEQUENT RECALL

(71) Applicant: INTERNATIONAL BUSINESS MACHINES CORPORATION, Armonk, NY (US)

(72) Inventors: John S. Werner, Fishkill, NY (US); Diane Marie Stamboni, Poughkeepsie, NY (US); Sneha Mary Varghese, Fishkill, NY (US); Kavita Sehgal, Poughkeepsie, NY (US); Nicholas George Danyluk, Long Island City, NY (US); Sarah Wu, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 16/804,896

(22) Filed: Feb. 28, 2020

(65) Prior Publication Data

US 2021/0271871 A1 Sep. 2, 2021

(51) Int. Cl.
*G06F 40/284* (2020.01)
*G06V 30/416* (2022.01)
*G06F 40/134* (2020.01)
*G06F 40/289* (2020.01)
*G06F 40/30* (2020.01)

(52) U.S. Cl.
CPC .......... *G06V 30/416* (2022.01); *G06F 40/134* (2020.01); *G06F 40/284* (2020.01); *G06F 40/289* (2020.01); *G06F 40/30* (2020.01)

(58) Field of Classification Search
CPC ............ G06K 9/00463; G06K 9/00469; G06F 40/134; G06F 40/289; G06F 40/284; G06F 40/10; G06F 40/20; G06F 40/30
See application file for complete search history.

(56) References Cited

U.S. PATENT DOCUMENTS

| 6,047,126 A | 4/2000 | Imai |
| 6,272,461 B1 | 8/2001 | Meredith et al. |
| 6,684,254 B1 | 1/2004 | Dutta |
| 7,783,614 B2 | 8/2010 | Jones et al. |
| 9,703,763 B1 | 7/2017 | Zemach |
| 2002/0143808 A1 | 10/2002 | Miller et al. |
| 2007/0218448 A1* | 9/2007 | Harmeyer ................ G09B 5/00 434/350 |
| 2010/0030765 A1* | 2/2010 | Chi ........................ G06F 40/20 707/726 |
| 2015/0379094 A1 | 12/2015 | Ehlen et al. |

(Continued)

*Primary Examiner* — Sanchita Roy
(74) *Attorney, Agent, or Firm* — Teddi E. Maranzano (57) ABSTRACT

A method, system, and computer program product are provided. During creating a document by a creation module, the content of the document is analyzed. Sources used while creating the document are analyzed using NLP, sentiment analysis, tone analysis, speech-to-text, and visual recognition. The sources are associated with a location in the document. Sources are filtered out based on a degree of correlation to the document. Sources are linked to the document where a correlation is found between the document and the sources. The linked sources are stored in a database for recall. During a presentation of the document, upon receiving a question, the question is analyzed to determine a relevant logical section of the document, and the relevant sources are retrieved.

10 Claims, 5 Drawing Sheets

(56) References Cited

U.S. PATENT DOCUMENTS

2016/0189556 A1     6/2016  Clark et al.
2016/0239489 A1*    8/2016  Cunico ................ G06F 16/435
2018/0365325 A1*   12/2018  Gireesha ................ G06F 16/38

* cited by examiner

SOURCE LINKING AND SUBSEQUENT RECALL

BACKGROUND

Embodiments of the invention generally relate to computer systems, and more specifically to source linking and subsequent recall.

During a presentation, the audience may have questions about the information being presented. The presenter may have additional sources available to answer a question during the presentation, but locating and launching the additional information may disrupt the flow of the presentation, causing others to lose interest or forcing the presenter to rush to complete the presentation.

An easy and efficient approach to link information in a presentation to additional sources can improve the audience's understanding of presentation materials.

SUMMARY

Among other things, a method is provided. During creating a document by a creation module, the content of the document is analyzed. Sources used while creating the document are analyzed using NLP, sentiment analysis, tone analysis, speech-to-text, and visual recognition. The sources are associated with a location in the document. Sources are filtered out based on a degree of correlation to the document. Sources are linked to the document where a correlation is found between the document and the sources. The linked sources are stored in a database for recall. During a presentation of the document, upon receiving a question, the question is analyzed to determine a relevant logical section of the document, and the relevant sources are retrieved.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

The present disclosure relates generally to the field of user computing technologies, and in particular to source linking and subsequent recall. During a presentation, questions from audience members can afford the presenter an opportunity to discuss information related to the presentation topics in more depth to accommodate the level of interest of the audience. In that case, the presenter can have additional sources prepared so that he can anticipate audience questions and respond in a thorough and informative manner. However, in current practice, locating and launching the additional information may disrupt the flow of the presentation, causing others to lose interest. As another example, the presenter may not have prepared sources ahead of time. Sources may be added to the presentation, but the presenter may not record the location of the source (e.g., website, saved document) in the presentation. This adds to the difficulty of retrieving additional information during the presentation. The presenter may become distracted and focus on the newly introduced details to the detriment of the main topics, thereby forcing the presenter to rush to complete the presentation. One way for a presenter to prepare additional information is through adding speaker's notes in the presentation tool slides. However, this solution relies on the presenter to remember the location of the additional material in the speaker's notes, and to easily access that location without unnecessarily distracting the audience. Embodiments of the present invention create a source list that includes content that is visible to a user (presenter) for greater than a threshold amount of time while working on creating a document. Other embodiments provide a document linking system to compare a source list to a user created document to filter out unrelated content from the source list. The document linking system can create links between relevant sources and sections of the user created document, such as a presentation, based on overlapping content. Further embodiments can take as input, an audience question related to the presentation, analyze the question, determine which section of the presentation the question most likely relates to, and launch linked sources to answer the question. If the answer to the question is in the presentation, the answer content can be highlighted. The document linking system further provides altering the presentation to insert data from a linked source to answer an audience question.

Embodiments of the invention will now be described in more detail in connection with the Figures.

Figure 1:
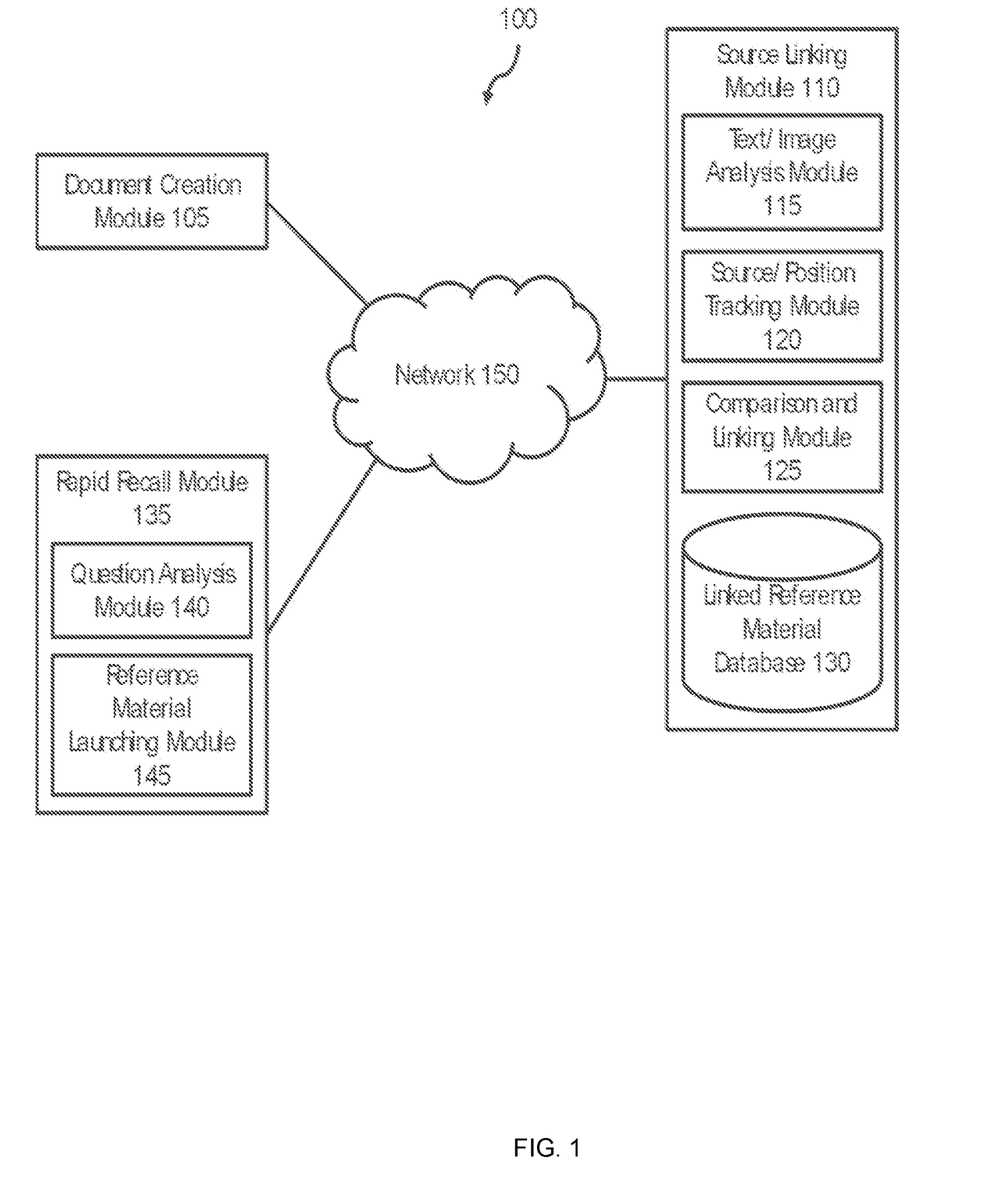
FIG. 1 is a functional block diagram of an illustrative system, according to an embodiment of the invention.

FIG. 1 is a functional block diagram of an illustrative document linking system 100, according to an embodiment of the invention. The document linking system includes a Document Creation Module 105, Source Linking Module 110, and Rapid Recall Module 135, all of which may be interconnected via wired or wireless Network 150. The modules 105, 110, and 135 may all reside on a single device or may be networked across multiple devices or servers.

The Document Creation Module 105 can be any program that could be used to create documents that may lead to follow-up questions from the audience. These documents include slide presentations, word documents, spreadsheets, emails, and videos.

The Source Linking Module 110 includes a Text/Image Analysis Module 115, Source/Position Tracking Module 120, Comparison and Linking Module 125, and Linked Reference Material Database 130.

The Text/Image Analysis Module 115 can analyze text, images, video, etc. in the document that is being created (module 105), as well as sources (e.g., websites, apps, programs, spreadsheets, other stored documents, emails, etc.) that are accessed while the user is working on the presentation document. Text analysis may include Natural Language Processing (NLP), sentiment analysis, etc. and may be performed by programs and applications such as IBM Watson™ Natural Language Classifier, IBM Watson™ Natural Language Understanding, IBM Watson™ Personality Insights, IBM Watson™ Tone Analyzer, and Watson™ Discovery. IBM Watson™ is a trademark of IBM in the United States.

The output of the Text/Image Analysis Module 115 module is a file that contains the results of the analysis. For NLP, the output can be sequence to sequence or string transduction which is a text output that is shorter than the input. This could include summarization, simplification, scoring of important keywords and how often they appear, or common words that appear near each other (n-grams). For images, a text output of the identified objects may be outputted and their XY position in the image noted. The images within video can be analyzed the same way. The audio within a video can be converted to text, then analyzed similar to text in any other document/source. In embodiments of the present invention, of the various methods to analyze text and image, sentiment analysis is likely to be utilized less frequently because the purpose of the analysis is matching text between the user created document and the sources. The resulting output of the analysis can be stored in the Linked Reference Material Database 130. This output of the Text/Image Analysis Module 115 is used by the program, such as the Rapid Recall Module 135, to determine which source to recall during a presentation.

Image and video analysis may include the use of visual recognition and speech-to-text software and may be performed via programs and/or applications such as IBM Watson™ Visual Recognition, and IBM Watson™ Speech to Text, in a similar way to that disclosed above with reference to the Text/Image Analysis Module 115.

The Source/Position Tracking Module 120 tracks which sources are being accessed by the user, based on windows that have focus or are visible (i.e., viewable) to the user, which position within the source were viewable by the user, and the duration that the user viewed each source. This information is stored to database 130 and could be in the same file that is created by module 115. By storing the data in the same file, we have association with the name of the source.

A source is any file/document that the user has open on a device while the Document Creation Module 105 is open and the user is working on a new document. For example, the user may have many windows open, such as multiple word documents or multiple tabs within an internet browser. The program only tracks the amount of time that those sources are viewable by the user. Viewable/visible sources are those that are not minimized, and that are not covered by another window on top, blocking content from being viewed. Either the source or the document being edited may have the focus. That is, the user may be editing a document on one monitor while extracting information from a source that is open on another monitor.

The position within the source can be narrowed down by what is viewable and how long the user left a section of the source viewable. For example, a word document may be 20 pages, but the majority of the user's time was spent on pages 5-7. If this source is recalled later, the program can more rapidly find the important information by first focusing on those pages.

The position within the source can further be identified by comparing the output from the Text/Image Analysis Module 115 that was added to the document by the Document Creation Module 105 and the output of the Text/Image Analysis Module 115 on the currently visible sources. The program can identify common keywords, or word associations between the two outputs. This comparison can be done using IBM Watson™ Compare and Comply. Other known tools exist, including plagiarism detection software.

The Linked Reference Material Database 130 stores all links to the sources identified by the Comparison and Linking Module 125 such that they can be rapidly recalled later if a question arises with the user created document. The actual sources can be saved on the user device already or in cloud storage. Therefore, the program only needs the path to the source. In some embodiments, it would be advantageous to store the actual source. For example, if the user creates a presentation that another person is to present, that other presenter may not have the source documents. In that case, when transferring the file, the user could be provided the option to also transfer all linked files (e.g., in a zip folder). For web sources, those would typically be links that could be recalled anywhere as long as the user has an internet connection. If the user knows they will presenting in a location where they may not have an internet connection, they could be provided an option to download the .html page.

If the sources are stored, they could also be saved to database 130. If the document is ever transferred (emailed, saved to a shared cloud (e.g., box), or saved to a flash drive) all data related to that document would also need to be transferred, including the sources and the output from the Text/Image Analysis Module 115 and the Source/Position Tracking Module 120.

The Rapid Recall Module 135 includes a Question Analysis Module 140 and a Reference Material Launching Module 145. The Question Analysis Module 140 can receive a question as input in the form of either speech or text and perform an analysis (similar to the analysis described with reference to Text/Image Analysis Module 115) to determine what portion of the user created document relates most strongly to the question.

The Reference Material Launching Module 145 takes input from the identified portion of the document outputted by the Question Analysis Module 140, and launches programs/applications from the Linked Reference Material Database 130 relating to the identified portion of the document. The determination of where the question most relates to a portion of the presentation is done similar to the comparison described previously with reference to IBM Watson™ Compare and Comply. The Question Analysis Module 140 passes the position in the presentation to which the question most relates to the Reference Material Launching Module 145. This module may then perform a further comparison of the question analysis to any documents that were linked to the identified section of the user created document, if there is more than one, to launch the highest match source that could help answer the question.

Figure 2:
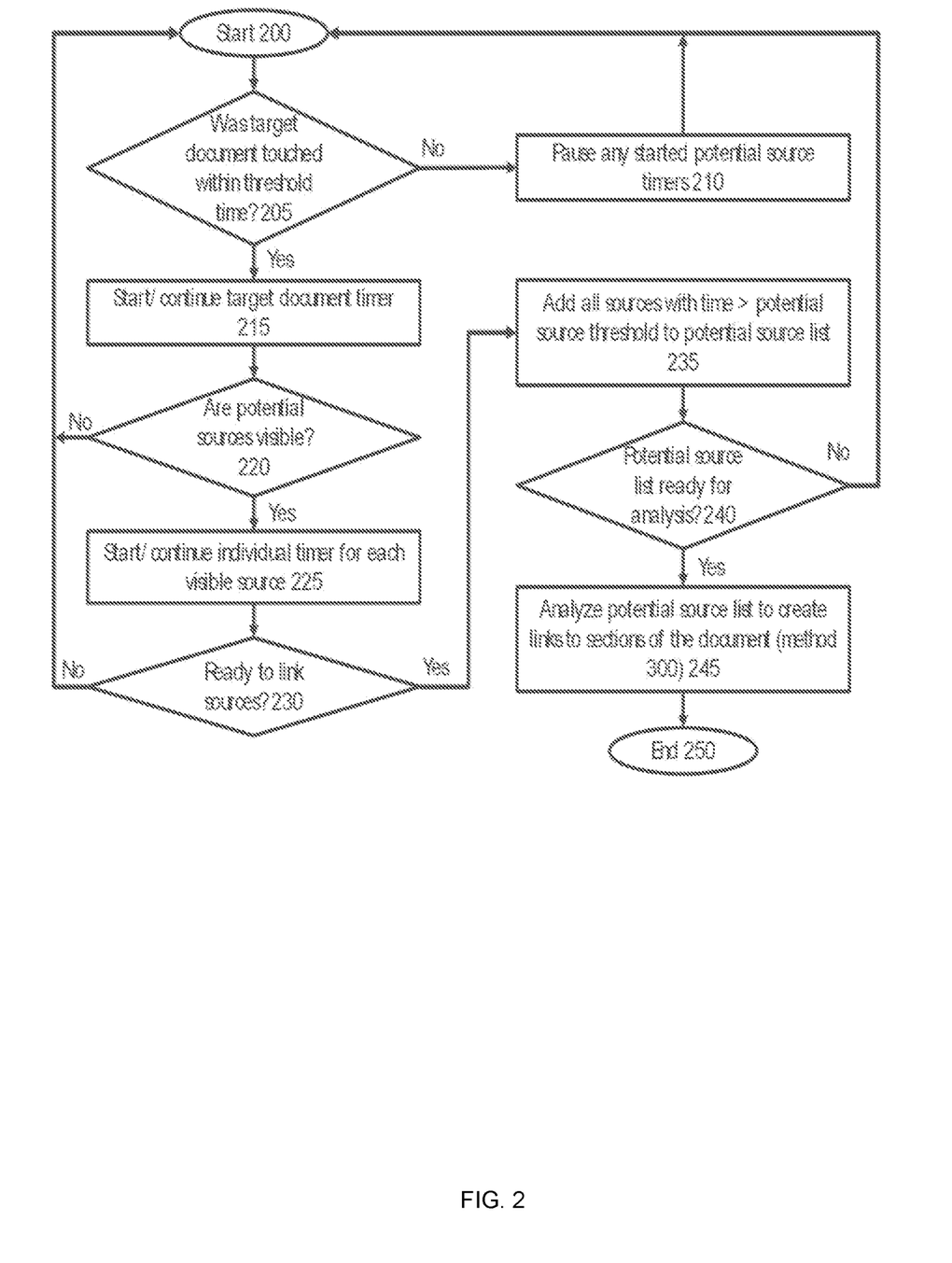
FIG. 2 is a flowchart of collecting sources during document creation.

FIG. 2 is a flowchart of collecting sources during document creation, and describes how the Source/Position Tracking Module 120 collects a list of sources while the user is creating a document.

Potential sources can be stored directly in the Linked Reference Material Database 130, or in a temporary storage, such as computer memory or disk storage outside of the Linked Reference Material Database 130. Once the Source/Position Tracking Module 120 determines that a potential source applies to the user created document, the potential source is now considered a source and will be moved from temporary storage to the Linked Reference Material Database 130. In the case where all potential sources were saved to the Linked Reference Material Database 130, any potential source that does not apply to the user created document can be deleted.

The document linking system (program) begins at decision block 205 to determine if the target document being prepared by the user has been touched within a configurable threshold time. In this context, "touched" is indicated by a user making any change to the user created document. Typical word processing, spreadsheet, and presentation programs have mechanisms built in to track a history of actions. The program can access this document history to check the modification date/time or use a checksum to indicate that the user created document has changed.

However, touching the document does not include the case where the user simply opens the document, since the user may just read through and close it without making any changes. Similarly, touching the document does not include the user simply putting focus on the user created document window. For example, the user may have the user created document open in the background, accidentally click it and give it focus for a brief amount of time because there are many windows open on the device before subsequently switching to the originally intended program or document. The threshold time may be set depending on the type of document. For example, an email may have a relatively low threshold time such as 10 minutes, while a presentation can have a threshold time of 1 hour.

If the target document was not touched (block 205 "No" branch), at block 210 timers for any potential sources are paused before looping back to the start to wait for the user to access the target document.

The timers may be stored in temporary memory. Alternatively, they may be stored in the Linked Reference Material Database 130. If any of the source timers does not exceed a threshold time at block 230, that source may be deleted from temporary memory or from the Linked Reference Material Database 130. This is all managed within the Source/Position Tracking Module 120. The timers count up (increment). They may be paused if a user takes a break, such as beginning to work on something else and not touching the user created document in a while, or if the user closes the user created document, but works on it another time. In that case, the timers would need to be saved to the Linked Reference Material Database 130, and not to temporary memory. In that way, the timers can be recalled later when the user reopens the user created document to continue working and can continue to increment. A timer is not reset.

If the target document was touched (block 205 "Yes" branch), the program proceeds to block 215 to either start or continue a timer that tracks the duration of time since the user created document was last touched. At decision block 220, the program determines if potential sources are visible, or viewable, to the user. These are only potential sources at this point because they have not been further analyzed to determine their relation to the user created document.

To determine if potential sources are visible, or viewable, the program references operating system data to know which windows are open, their position on one or more monitors, and if any of the windows is being blocked. If a window is not minimized and not blocked by another window, the program knows it is visible to the user even if the window does not have focus. For example, the user may be working on the user created document which has focus, but may be looking at a source in another unblocked window to extract information to enter into the target document.

Being visible, or viewable, to the user means that another window/program has received focus, is viewable on a portion of the user display, or viewable on additions displays if the user has multiple monitors. If potential sources are not visible to the user (block 220 "No" branch), the program loops back to the start. For example, no other potential sources are open on the user device or the target document takes up the full view of the display.

If potential sources are visible to the user (block 220 "Yes" branch), the program proceeds to block 225 to start/continue individual timers for each visible source.

In some embodiments, the program may have additional information relating the time spent on different portions of the potential source and which portion of the user created document is being worked on around the time the potential source was visible.

At decision block 230, the program determines if any sources are ready to be linked. This is indicated by a threshold time being reached for one or more potential sources based on the timers at block 225. The threshold time may be set low to ensure that a potential source is captured even if the user is referencing the source for a brief moment to extract data. The threshold time is set to prevent the need for analyzing items that were only accessed for a brief time and were likely selected mistakenly or due to a notification. For example, if the user clicks an incorrect tab in a web browser and only remains on the page for 2 seconds, or the user opens an incorrect spreadsheet but closes it within 5 seconds. As another example, the user may see a notification for an email and switches over to the email program for 10 seconds to see the sender and email subject before returning to work on the target document. In some embodiments, a timer may not be used for potential sources and all accessed items may be added to a potential source list.

If potential sources are not ready to be linked (block 230 "No" branch), the document linking system loops back to the start (200). If potential sources are ready to be linked (block 230 "Yes" branch), the program moves to block 235 to add all sources that have exceeded the threshold time to a potential source list.

If potential sources are ready for analysis (block 240 "Yes" branch), the program proceeds to block 245 to analyze the potential source list to create links to sections of the document. Block 245 is described further with reference to FIG. 3. The analysis will filter out items that were added to the potential source list that have no relation to the user created document as well as create links to real sources such that they can be rapidly recalled later if questions arise from others viewing the user created document. After analysis, method 200 ends at block 250.

Figure 3:
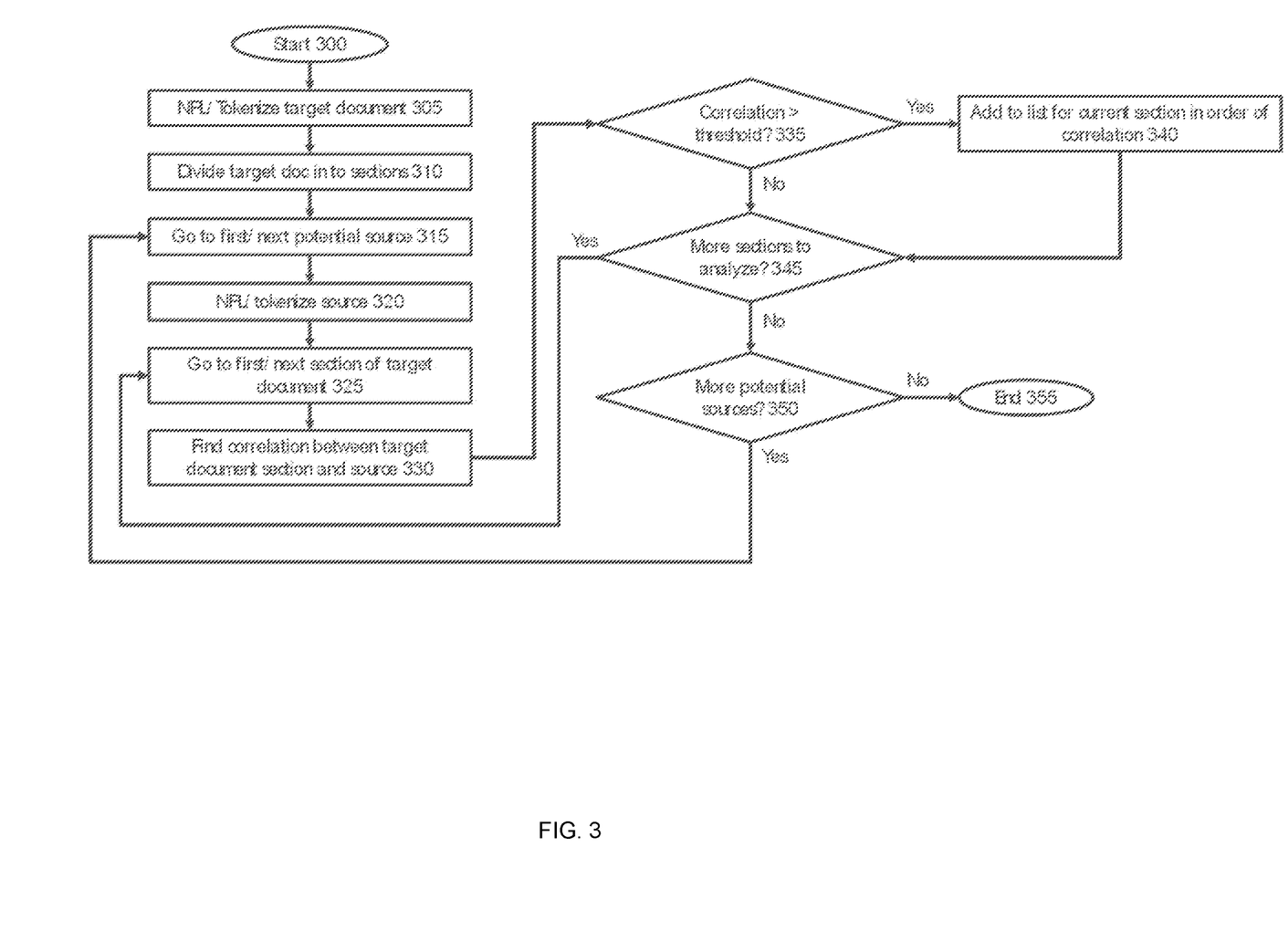
FIG. 3 is a flowchart of linking sources in the presentation, according to an embodiment of the invention.

FIG. 3 is a flowchart of the document linking system linking sources in the user created document, according to an embodiment of the invention. The program begins at 300.

At block 305, the user created document is tokenized and processed using NLP. The Text/Image Analysis Module 115 can be invoked to perform image and video recognition.

At block 310, the user created document can be divided into sections. For slide presentations, the sections can be created based on slide number. For word documents, emails, and similar documents, the sections can be divided by page number, paragraph, chapter, and other divisions that are logical to the type of document. At 315, each source in the potential source list is examined. At block 320, the current potential source in the list is tokenized, and NLP is performed on the current potential source. Image/video recognition may also be performed on the potential source at this point. In preferred embodiments, this analysis is performed only once on each potential source. Each section of the user created document is examined, starting at block 325.

At block 330, the program determines if there is correlation between the current section of the target document and the current source in the iteration process. Correlation can be determined based on the quantity of overlapping content between the section of the user created (target) document and the potential source, using tools such as IBM Watson™ Natural Language Understanding, IBM Watson™ Compare and Comply, and IBM Watson™ Knowledge Studio. At this step, any items that were added to the potential source list that were not related to the user created document will be filtered out. For example, a user checking an email on an unrelated topic, or checking the local weather or news.

The potential source list contains anything the user may have looked at during creation of the document. The content within the potential source is not analyzed until now. So, it is likely that the user will check different things that have nothing to do with the document while creating the document. This is where the program determines if any correlation exists and how close the potential source is to content within the user created document to determine if the potential source is actually a source.

At decision block 335, if the correlation is above the configurable correlation threshold (block 335 "Yes" branch), at block 340 the potential source is added to a list of potential sources, which can be stored in the Linked Reference Material Database 130 for the current section in the user created document. The correlation threshold may be a set value (e.g., 75%) or the correlation threshold may be dynamic based on such factors as the size of the target document, number of sections in the target document, and number of potential sources. Potential sources that are below the correlation threshold are filtered out, leaving the sources. The ordering of remaining sources based on correlation score is dependent upon the section of the user created document being looked at. The program can store the correlation scores in a table, such as a hash table.

If the user created document is stored on the user device, the storage resource may be minimized by only storing the path of the file to the source or a web link to the source. If the user created document is exported to another device, the sources can be downloaded and transferred with the user created document to another device. This may occur in order to ensure that all the sources needed to create the user created document are available on the other device. If the user created document is stored on the user device, usage of the storage resource may be minimized by only storing the path of the file to the source or a web link to the source. If the user created document is exported to another device, the sources can be downloaded and transferred with the user created document to another device. This may occur in order to ensure that all the sources needed to create the user created document are available on the other device.

At block 345, a determination is made whether there are more sections to analyze in the user created document. At block 310, the user created document was divided into sections. Therefore, the program analyzes the sections until all the sections are analyzed. If there are, then at block 325, the next section of the user created document is retrieved. When there are no more sections in the user created document to analyze (block 345 "No" branch), at block 350, a determination is made whether there are more potential sources for analysis in the potential source list. If there are more potential sources in the potential source list to analyze (block 350 "Yes" branch), the next potential source in the list is retrieved at block 315. Since the analysis at block 320 is only performed once on each potential source, the program can then retrieve the NLP analysis associated with the next source which can be stored in the Linked Reference Material Database 130 along with the source. Once the program completes at 355, the NLP analysis files are no longer needed and can be deleted or allocated as available memory for other tasks.

If there are no more potential sources in the potential source list to analyze (block 350 "No" branch), then all the sources are linked to their corresponding sections in the user created document and the program may end at block 355.

Figure 4:
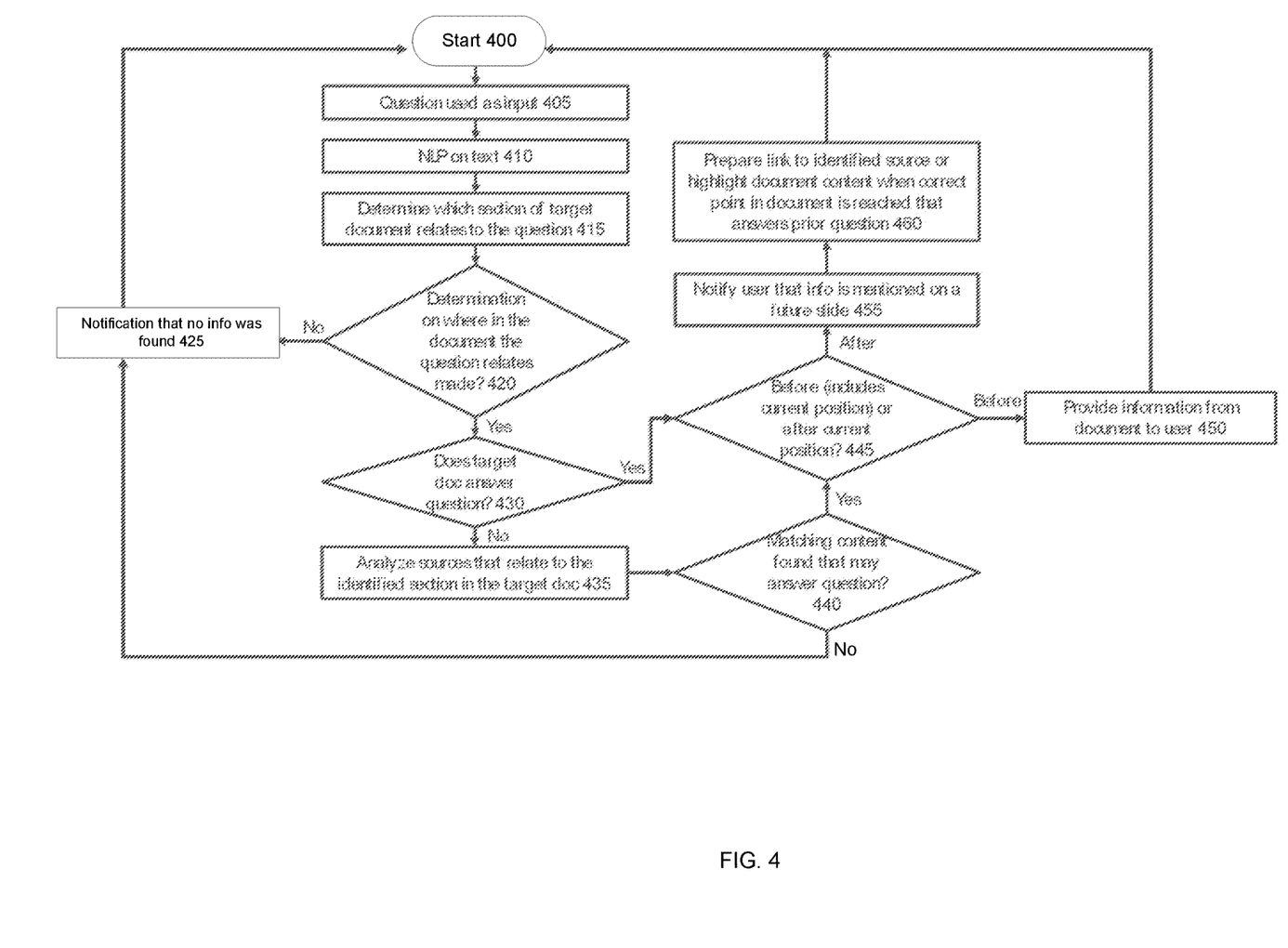
FIG. 4 is a flowchart of question analysis and rapid information recall.

FIG. 4 is a flowchart depicting question analysis and rapid information recall while viewing the user created document. For example, this can include an audience attending a presentation, reading a word document, or viewing a web page. The attendance may be in person or in a virtual meeting, such as WebEx™ or Skype™.

At 405, an audience member (viewer) asks a question. The question may be asked aloud, or recorded via speakers in the presentation area, and then converted to text by any one of known speech-to-text algorithms. Alternatively, the question can be manually input, for example, in a chat window of a video conference. At block 410, the question may be tokenized and further analyzed by the Question Analysis Module 140 using NLP. The analysis may be stored in the Linked Reference Material Database 130 for future reference.

At block 415, the output of the analysis of the question (performed at block 410) is compared to the user created document to determine to which section the question likely relates. The output of the analysis of any documents may be stored in the Linked Reference Material Database 130. One method for performing the comparison may be to find the section with the highest correlation, regardless of what that correlation value is. Alternatively, the program may only consider sections that have correlation above a threshold (e.g., 50%). The lower the correlation threshold, the more likely it is that a question has not yet been answered, or is yet to be answered further on in the presentation. If more than one section is identified, the program can iterate through method 400 starting with the section that has the highest correlation factor.

Analysis can start with the current section that is being viewed. Alternatively, the analysis can be split into two threads, one proceeding backward from current position, and one proceeding forward from current position. The multi-threaded analysis may be performed simultaneously by the threads. At decision block 420, the program determines if the section of the user created document is located that related to the input question. In other words, this is the result of block 415 finding a high correlation between the question and the user created document. At 425, the program provides a notification that no additional information was found to answer the question. The notification can be to the presenter, the person asking the question, or to all parties.

For the presenter, the notification may be on a popup on the screen or another monitor (e.g., popup is on the user's laptop but not the projector screen). For web-based audience members, the notification can also be on their device, for example, to alert the audience members that the presenter will have to answer the question without supporting sources available or get back to them later with an answer. The notification may also indicate that the question will be answered later in the presentation.

If the user created document is continuously provided to different audiences, such as a presentation that is made multiple times, the user that created the document may be provided feedback after the presentation on questions that arose and the point in the document such that updates can be made. In this way, the precision and accuracy of the presentation may be improved, for example, because there is predictability in the questions. Additionally, all linked sources for the entire document may be searched to determine if supporting documentation to answer the question exists.

Feedback may be a count of which sections in the user created document led to participant questions and a count of which sources and the position within the source that was launched to assist the presenter in answering the questions. For example, after a presentation has been made x number of times (e.g., 5 times), feedback can be provided if the same questions are asked (e.g., 50% of the time the presentation is made). The count could be stored in the Linked Reference Material Database 130. The feedback may be given to the presenter within the Document Creation Module 105, via notification, or via email.

If at 420, additional information was linked in the user created document, at 430 the program determines if the user created document itself answers the question without launching any linked source. This is done by referencing the NLP analysis of the user created document that was stored in the Linked Reference Material Database 130 to determine if there is a high correlation between that analysis and the question being asked. If no matching content was found that may answer the question (block 440 "No" branch), the method moves to block 435.

If matching content was found that may answer the question (block 440 "Yes" branch) or if the user created document does answer the question (block 430 "Yes" branch), the program proceeds to block decision 445 to determine if the question relates to content that was prior to or after the relative current position in the user created document. NLP analysis of the question is correlated to the NLP analyzed user created document. Here, the simultaneous multithread forward/backward search facilitates the search.

If the question relates to content that was prior to or at the current position in the user created document (block 445 "Before" branch), the program moves to block 450 to provide information from either the user created document or a linked source to the viewer. The information may be provided by a popup on the audience member's computer during a web meeting. The viewer may be brought back to the previous point in the user created document to show information directly from the presentation. This may be done by launching a separate window or tab. One window will continue to display the live view, while the other window displays the previous point where the question is answered. This may be an applicable solution if this is during a web meeting, and only the viewer that asked the question is directed to the relative portion of the user create document. The linked source that answers the question may be launched on the screen of the viewer or the presenter screen.

The Document Creation Module 105 communicates with the operating system on the device where the user is creating the user created document to launch the source in the correct program. This process is similar to how a command prompt is used in Windows™ to type in the name of, and launch, the desired program. If the desired program is included in the PATH System variable, the program can be executed directly. Otherwise, the full path to the program is required. This full path may be retrieved from the Linked Reference Material Database 130 where it was saved during document creation. The file extension will determine what program is required and that program will format the file correctly for display.

When documents are exported (i.e., when the user created document is transferred to another user), the other user may not have the correct program, such as PowerPoint™ OpenOffice, or Word™. In this case, the user will not be able to open the transferred user created document, but the exported files may be converted to a common file type, such as .PDF.

The program may notify the presenter that the information to answer the question has been located, but the program may ask for verification that launching the display of the linked source is accepted. Depending on the implementation, the user may have the ability to change profile setting such that the documents are automatically launched, for example, in a split screen format.

The information, either earlier in the presentation or within a linked source, may be highlighted to more easily locate and to distract from viewing of the user created document as little as possible.

If the question relates to content that will appear later in the user created document (block 445 "After" branch), the program moves to block 455 to notify the viewer and/or the presenter that information, such as a linked source that answers the question, will be mentioned on a future slide.

At block 460, a link to the identified linked source is prepared for highlighting in the user created document when the correct point is reached that answers the prior question. The display of the content when this future point is reached in the document may be similar to the displaying of content described at block 450. Alternatively, if the content is in a linked source, the future section in the user created document may be altered such that the linked source does not have to be launched, i.e., the linked source is incorporated in the user created document. This alteration may be done by inserting a snippet right into the user created document. An icon may be inserted that represents the inserted snippet. The presenter, or remote audience member viewing through their device, may click to show the inserted content such that formatting of the user created document is not negatively impacted. This would be compatible for PowerPoint™ OpenOffice, and other presentation formats. If the document being presented is a Word™ document, then the text can be inserted directly into the document without impacting the document format.

A notification may be provided to the presenter that a change to the user created document is being made. Processing continues until the viewer completes viewing of the document.

Figure 5:
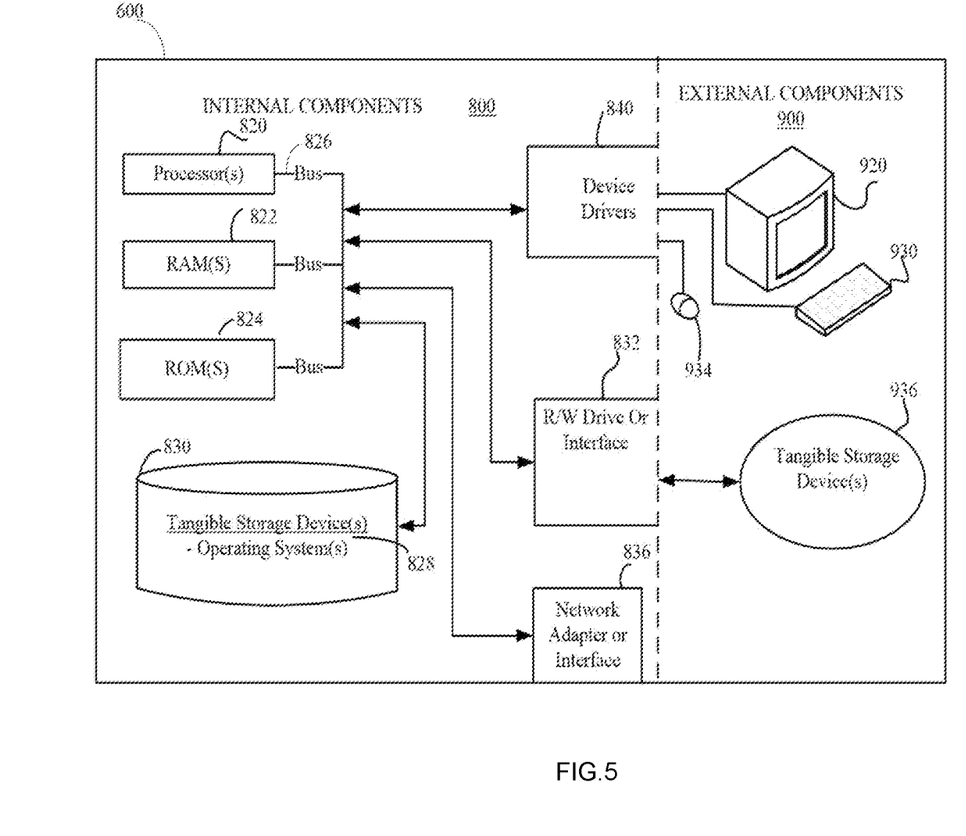
FIG. 5 is an illustrative functional block diagram of a computing device for implementing aspects of the present invention, according to an embodiment of the invention.

FIG. 5 illustrates an exemplary computing device 600 applicable for executing the algorithm of FIGS. 2-4. Computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the algorithm of FIGS. 2-4; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836.

External components 900 can also include a touch screen 920 and pointing devices 930. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for source linking and subsequent recall, comprising:
   during creating a user created document by a creation module:
      starting a timer associated with the user created document, wherein the user created document timer tracks whether the user created document is being touched, wherein the user created document is associated with one or more potential sources of a set of potential sources;
      in response to the user created document not being touched for a configurable first threshold amount of time, pausing one or more timers, each timer associated with a respective visible potential source of the one or more potential sources, and storing each paused timer in permanent storage;
      in response to a new visible potential source, starting a new timer and continuing each timer associated with the one or more visible potential sources, wherein the new visible potential source is different from each of the one or more visible potential sources and wherein the new visible potential source is added to the set of potential sources;
      adding all potential sources of the set of potential sources having the associated timer exceeding a second threshold amount of time for the potential source to a potential source list; and
      associating each potential source in the potential source list with a location in the user created document, wherein the associating further comprises:
         linking each potential source to a related section in the user created document in response to determining a degree of correlation between the user created document and the potential source exceeds a configurable threshold;
         storing each linked source in a database for recall; and
         deleting the potential source from the potential source list in response to determining the degree of correlation does not exceed the configurable threshold.

2. The method of claim 1, further comprising:
   in response to determining that the user created document is touched within the first threshold time, wherein the threshold time begins when the user created document is modified;
   dividing the user created document into sections, wherein each section is a logical division based on a type of document;
   beginning with a first section in the user created document, and proceeding through each section:
      iterating through each entry in the potential source list:
         determining the degree of correlation between a current section and a current source in the potential source list,
         in response to the degree of correlation being at least the configurable threshold, adding the current source to an ordered list ordered by the degree of correlation, and
         storing the current source ordered list entry to a linked reference material database.

3. The method of claim 1, wherein the degree of correlation is a configurable threshold based on a quantity of overlapping content between a source in the potential source list and a section in the user created document.

4. The method of claim 1, further comprising:
   altering a section in the user created document to insert content from a linked source, thereby avoiding the launching of the linked source, wherein the altering includes:
      inserting the content into the user created document;
      representing the inserted content by a clickable icon; and
      in response to clicking the clickable icon, displaying the inserted content.

5. A computer program product for source linking and subsequent recall, the computer program product comprising a non-transitory tangible storage device having program code embodied therewith, the program code executable by a processor of a computer to perform a method, the method comprising: during creating a user created document by a creation module:
   starting a timer associated with the user created document, wherein the user created document timer tracks whether the user created document is being touched, wherein the user created document is associated with one or more potential sources of a set of potential sources;

in response to the user created document not being touched for a configurable first threshold amount of time, pausing one or more timers, each timer associated with a respective visible potential source of the one or more potential sources, and storing each paused timer in permanent storage;

in response to a new visible potential source, starting a new timer and continuing each timer associated with the one ore more visible potential sources, wherein the new visible potential source is different from each of the one or more visible potential sources and wherein the new visible potential source is added to the set of potential sources;

adding all potential sources of the set of potential sources having the associated timer exceeding a second threshold amount of time for the potential source to a potential source list; and associating each potential source in the potential source list with a location in the user created document, wherein the associating further comprises:

linking each potential source to a related section in the user created document in response to determining a degree of correlation between the user created document and the potential source exceeds a configurable threshold, storing each linked source in a database for recall; and deleting the potential source from the potential source list in response to determining the degree of correlation does not exceed the configurable threshold.

6. The computer program product of claim 5 further comprising:

based on determining that the user created document is touched within the first threshold time, wherein the threshold time begins when the user created document is modified;

dividing the user created document into sections, wherein each section is a logical division based on a type of document;

beginning with a first logical section in the user created document, and proceeding through each section:

iterating through each entry in the potential source list:

determining the degree of correlation between a current logical section and a current source in the potential source list, based on the degree of correlation being at least the configurable threshold, adding the current source to an ordered list ordered by the degree of correlation, and storing the current source ordered list entry to a linked reference material database.

7. The computer program product of claim 5, wherein the degree of correlation is a configurable threshold based on a quantity of overlapping content between a source in the potential source list and a section in the user created document.

8. A computer system for source linking and subsequent recall, comprising:

one or more processors; and a computer-readable memory coupled to the one or more processors, the computer-readable memory comprising instructions for:

during creating a user created document by a creation module:

starting a timer associated with the user created document, wherein the user created document timer tracks whether the user created document is being touched, wherein the user created document is associated with one or more potential sources of a set of potential sources;

in response to the user created document not being touched for a configurable first threshold amount of time, pausing one or more timers, each timer associated with a respective visible potential source of the one or more potential sources, and storing each paused timer in permanent storage;

in response to a new visible potential source, starting a new timer and continuing each timer associated with the one or more visible potential sources, wherein the new visible potential source is different from each of the one or more visible potential sources and wherein the new visible potential source is added to the set of potential sources;

adding all potential sources of the set of potential sources having the associated timer exceeding a second threshold amount of time for the potential source to a potential source list; and associating each potential source in the potential source list with a location in the user created document, wherein the associating further comprises:

linking each potential source to a related section in the user created document in response to determining a degree of correlation between the user created document and the potential source exceeds a configurable threshold;

storing each linked sources in a database for recall; and deleting the potential source from the potential source list in response to determining the degree of correlation does not exceed the configurable threshold.

9. The computer system of claim 8, further comprising:

based on determining that the user created document is touched within the first threshold time, wherein the threshold time begins when the user created document is modified;

dividing the user created document into sections, wherein each section is a logical division based on the type of document;

beginning with a first logical section in the user created document, and proceeding through each logical section:

iterating through each entry in the potential source list:

determining the degree of correlation between a current logical section and a current source in the potential source list, based on the degree of correlation being at least the configurable threshold, adding the current source to an ordered list ordered by the degree of correlation, and storing the current source ordered list entry to a linked reference material database.

10. The computer system of claim 8, wherein the degree of correlation is a configurable threshold based on a quantity of overlapping content between a current source in the potential source list and a section in the user created document.

\* \* \* \* \*